United States Patent [19]
Garrick et al.

[11] Patent Number: 5,207,976
[45] Date of Patent: May 4, 1993

[54] PELLET SLIDE AND INSPECTION ASSEMBLY IN A NUCLEAR FUEL PELLET SURFACE DEFECT INSPECTION APPARATUS

[75] Inventors: Roosevelt Garrick, Gadsden; John F. Wilson, Columbia; Hassan J. Ahmed, Irmo, all of S.C.

[73] Assignee: Westinghouse Electric Corp., Pittsburgh, Pa.

[21] Appl. No.: 944,017

[22] Filed: Sep. 11, 1992

Related U.S. Application Data

[63] Continuation of Ser. No. 680,861, Apr. 5, 1991, abandoned.

[51] Int. Cl.$^5$ .................................................. G21C 19/00
[52] U.S. Cl. .................................... 376/261; 376/245; 376/252; 376/257; 376/258; 73/622; 209/590
[58] Field of Search ............... 376/245, 257, 261, 252, 376/258; 53/542, 504; 73/622; 209/590

[56] References Cited

U.S. PATENT DOCUMENTS

| | | | |
|---|---|---|---|
| 1,788,136 | 1/1931 | Vaughan et al. | 53/542 |
| 3,221,152 | 11/1965 | Jones | 235/151.13 |
| 3,552,190 | 1/1971 | Lefebvre | 73/67.7 |
| 3,897,673 | 8/1975 | Kee et al. | 53/61 |
| 4,158,601 | 6/1979 | Gerkey | 176/30 |
| 4,162,126 | 7/1979 | Nakagawa et al. | 356/237 |
| 4,193,502 | 3/1980 | Marmo | 209/555 |
| 4,209,960 | 7/1980 | Deutschlander et al. | 53/502 |
| 4,332,120 | 6/1982 | Haynes et al. | 53/245 |
| 4,349,112 | 9/1982 | Wilks et al. | 209/538 |
| 4,410,278 | 10/1983 | Makihira et al. | 356/445 |
| 4,466,286 | 8/1984 | Berbeé et al. | 73/629 |
| 4,566,835 | 1/1986 | Raymond et al. | 414/53 |
| 4,626,401 | 12/1986 | Oakley et al. | 376/345 |
| 4,690,284 | 9/1987 | Buckley et al. | 209/590 |
| 4,702,746 | 10/1987 | Finch | 44/14 |
| 4,748,798 | 6/1988 | Udaka et al. | 53/504 |
| 4,894,201 | 1/1990 | Ahmed | 376/261 |

OTHER PUBLICATIONS

"Inspector General" User's Guide, Aug. 1987 by Cochlea Corporation, title page, pp. 2-17, 3-9, 5-7 and drawing sheet SYS-001.

*Primary Examiner*—Donald P. Walsh
*Assistant Examiner*—Chrisman D. Carroll

[57] ABSTRACT

A fuel pellet surface defect inspection apparatus has an infeed conveyor, a discharge conveyor, and a slide and inspection assembly between the conveyors. The assembly includes a slide defining an inclined track having exit and entry ends adjacent the respective discharge and infeed conveyors. The entry end is at a higher elevation than the exit end. The assembly also includes an inspection station located along the track between its entry and exit ends. The station has lower and upper sound reflectors configured to define an annular inspection chamber through which a pellet moves as the pellet slides down the inclined track. The chamber completely encloses the cylindrical surface of the pellet as the pellet moves through the chamber. An ultrasonic inspection head is mounted at the station and transmits and receives sound energy to and from a pellet as it moves through the chamber such that the sound energy completely surrounds the moving pellet being inspected within the chamber. The inclined track has an upper portion extending to the inspection chamber and a lower portion extending from the inspection chamber and having a shallower slope than the upper portion to cause deceleration of a pellet as it moves from the upper portion to the lower portion. Deceleration reduces the velocity of the inspected pellet as it approaches the exit end of the track and thereby reduces the chance of impacts with the discharge conveyor that might otherwise produce chips and cracks in the pellets.

16 Claims, 4 Drawing Sheets

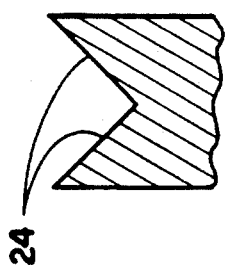
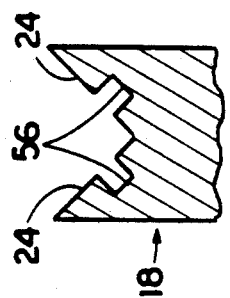
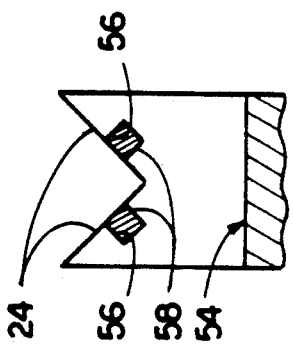
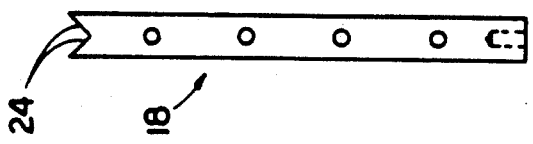
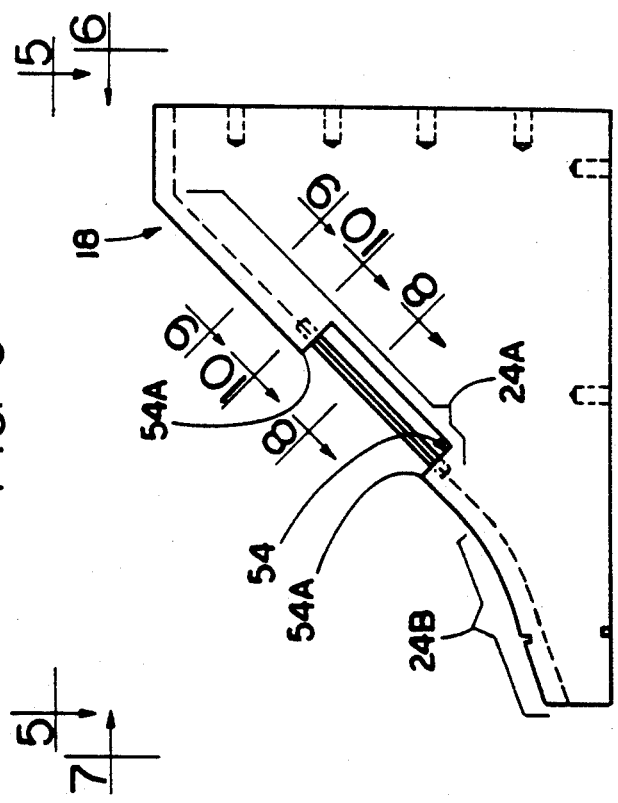
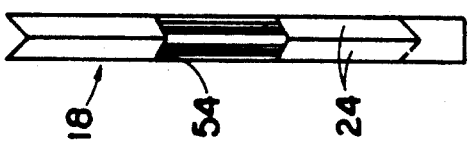

PELLET SLIDE AND INSPECTION ASSEMBLY IN A NUCLEAR FUEL PELLET SURFACE DEFECT INSPECTION APPARATUS

This application is a continuation of application Ser. No. 07/680,861 filed Apr. 5, 1991, now abandoned.

BACKGROUND OF THE INVENTION

1. Field of the Invention

The present invention relates generally to nuclear fuel pellet inspection and, more particularly, is concerned with an apparatus for inspecting fuel pellets for surface defects that employs a pellet slide and inspection assembly providing improved inspecting and handling of fuel pellets.

2. Description of the Prior Art

Nuclear reactors include fuel assemblies which contain pellets of fissionable material as their basic fuel element. In one exemplary embodiment, a pellet ideally takes the form of a right cylinder with slightly concave or dished opposite ends. For incorporation into fuel assemblies, a number of pellets are stacked end to end in a fuel rod cladding tube which, like the pellets, is usually of circular cross-section. Then, a given number of fuel rods are grouped together in a fuel assembly.

It is essential that all pellets used in the fuel assembly be free of circumferential defects, such as cracks and chips, in order to achieve desired stacking of the pellets within the fuel rod tube as well as uniform heat transfer between the stacked pellets and cladding tube and uniform consumption of the pellets during operation of the reactor core. Consequently, an important step in the manufacture of the nuclear fuel pellet is the inspection of its surface to ascertain whether there are any deflects present.

Exemplary prior art systems for inspecting and classifying nuclear fuel pellets are disclosed in U.S. Patent Nos. to Jones (U.S. Pat. Nos. 3,221,152; 3,272,332; and 3,282,116), Ryden, Jr. (U.S. Pat. No. 4,037,103), Marmo (U.S. Pat. No. 4,193,502), and Wilks et al (U.S. Pat. No. 4,349,112). While the inspection systems of these prior art patents appear to achieve their objectives under the range of operating conditions for which they were designed, none of these systems appear to be adapted to perform inspection of a pellet for circumferential or surface defects.

One commercial inspection apparatus, sold under the registered trademark, Inspector General, by Cochlea Corporation of San Jose, Calif., for inspecting and sorting small parts uses non-contact, three-dimensional ultrasonic vision to verify the identity, shape, defects, orientation, and sequence of parts. Its overall objective is to acoustically detect and cull out parts with shape defects. For a detailed understanding of this Cochlea Corporation inspection apparatus, attention is directed to a publication entitled "Inspector General User's Guide" dated Aug. 1987 and to U.S. Patent Nos. to Buckley et al (U.S. Pat. Nos. 4,557,386; 4,576,286; and 4,690,284) and Pinyan et al (U.S. Pat. No. 4,677,852) assigned to Cochlea Corporation.

Basically, inspection by this apparatus is accomplished while the parts are in transit. The parts to be inspected are fed down a chute from a vibratory bowl feeder by a singulation device. As each part is in transmit, it is exposed to 40 kHz sound waves emanating from suitable positioned emitters. The waves bounce off the part, and the reflections are then picked up by an array of transducers or sensors. Analysis of reflected sound waves gives each part an unique "acoustic signature", which is compared to a previously "learned" good part signature. Acceptance or rejection is based on the comparison. This acoustically-based system is said to outperform and be more versatile than more traditional vision, laser, tactile and proximity-sensing techniques. However, in its approach to parts handling and positioning, this "off-the-shelf" inspection apparatus is designed for general purpose parts inspection and sorting and thus cannot be used directly without modification, to inspect nuclear fuel pellets.

Certain improvements were made to this "off-the-shelf" inspection apparatus in U.S. Pat. No. 4,894,201 to Ahmed, which is assigned to the same assignee as the subject invention. These improvements adapt the apparatus for inspection of fuel pellets for surface defects, such as chips and cracks, by substituting a single pellet feeder, a pellet guide chute assembly, and a pellet discharge conveyor. The pellet guide chute assembly is inclined and extends through the inspection chamber. In sliding down the guide chute assembly, the pellets move along an inclined straight, or linear, path one at a time through the inspection chamber. Slots are provided in the chute assembly at the inspection chamber for receiving an ultrasonic inspection head. The inspection head mounts acoustical energy transmitting and receiving transducers which transmit acoustical energy into and received it from the inspection chamber for propagating such energy to and from the pellet as the pellet slid under the influence of gravity down the inclined chute assembly. The pellet position along the inclined chute assembly is sensed by light transmitting and receiving devices. Light is transmitted across the inspection chamber through openings in the chute assembly and thus across the path of movement of the pellets.

A drawback of the improved apparatus of the cited Ahmed patent is that, other than the particular inclination chosen for the chute assembly itself, there is no means of controlling the speed of the pellets as they slid down the inclined straight path defined by the chute assembly. The rapid rate at which pellets are allowed to slide uncontrolled down the straight inclined chute assembly often result in high impacts at the bottom with the pellet discharge conveyor, leading to cracking or chipping of the inspected pellets.

Consequently, a need still exists for additional improvements to better adapt this "off-the-shelf" ultrasonic inspection apparatus for use in inspection of nuclear fuel pellets.

SUMMARY OF THE INVENTION

The present invention provides an nuclear fuel pellet surface defect inspection apparatus designed to satisfy the aforementioned needs. In accordance with the present invention, the apparatus incorporates a pellet slide and inspection assembly which more accurately inspects one pellet at a time for surface defects while handling each pellet more gently.

The pellet slide and inspection assembly includes a pellet slide defining an inclined track and a pair of lower and upper sound reflectors disposed at an inspection station along the slide. The lower and upper reflectors are configurated to define an annular inspection chamber through which a pellet moves as it slides down the inclined track. The annular inspection chamber completely encloses the circumference of the pellet at the moment when a reading is taken, thereby enhancing the accuracy of the reading by making the sound signal emitted to and reflected from the pellet completely surround the pellet being inspected.

The pellet slide has upper and lower portions on opposite sides of the inspection chamber, the lower portion having a shallower, or more gradual, slope than the upper portion. After a pellet moves through the inspection chamber, it is decelerated by the change in the slope of the lower portion of the pellet slide track. This reduces the exit velocity of the inspected pellet, which greatly reduces the possibility of the pellet chipping due to contact with the discharge conveyor at the exit end of the pellet slide. Thus, more accurate ultrasonic inspection of each pellet is achieved while each pellet is handled in a manner that will prevent cracking or chipping.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is a side elevational view of a pellet slide removed from the pellet slide and inspection assembly of FIG. 3.

FIG. 5 is a top plan view of the pellet slide as seen along line 5—5 of FIG. 4.

FIG. 6 is an end elevational view of the pellet slide as seen along line 6—6 of FIG. 4.

FIG. 7 is an opposite end elevational view of the pellet slide as seen along line 7—7 of FIG. 4.

FIG. 8 is a sectional view of the pellet slide taken along line 8—8 of FIG. 4.

FIG. 9 is another sectional view of the pellet slide taken along line 9—9 of FIG. 4.

FIG. 10 is yet another sectional view of the pellet slide taken along line 10—10 of FIG. 4.

DETAILED DESCRIPTION OF THE INVENTION

Figure 1:
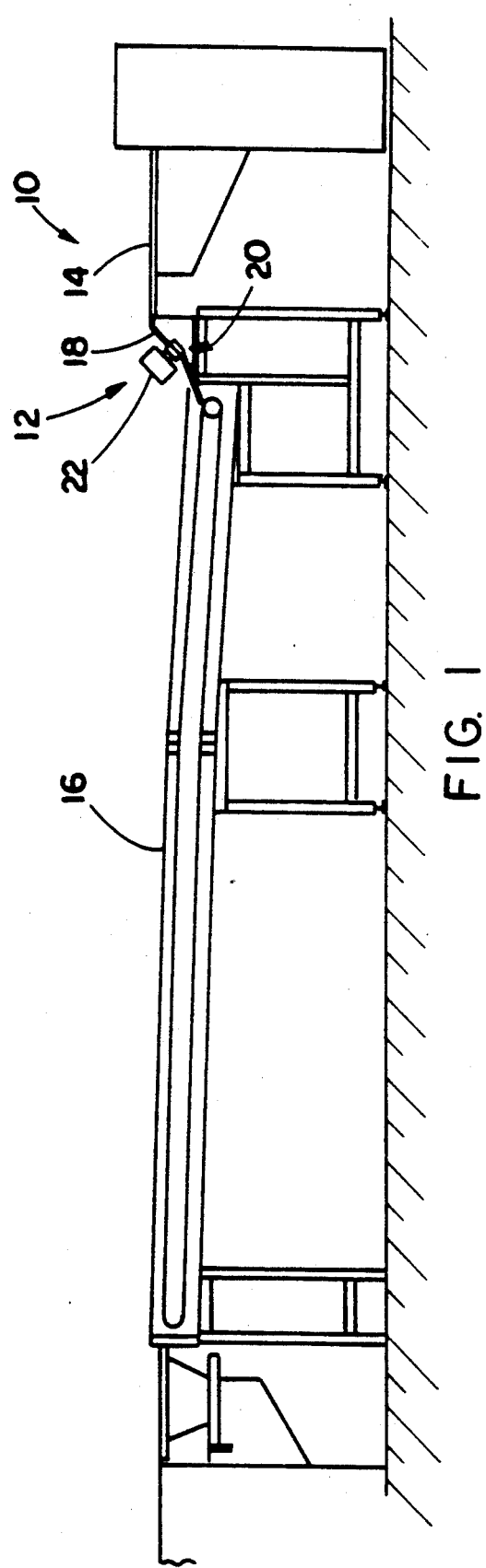
FIG. 1 is a side elevational view of a nuclear fuel pellet surface defect inspection apparatus in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, and particularly to FIG. 1, there is shown a nuclear fuel pellet surface defect inspection apparatus, generally designated by the numeral 10, which employs a pellet slide and inspection assembly 12 for separating and inspecting pellets P in accordance with the principles of the present invention. In its basic arrangement, the inspection apparatus 10 includes the pellet slide and inspection assembly 12 and a pellet infeed conveyor 14 at the input side of the assembly 12 and a pellet discharge conveyor 16 at the output side of the assembly 12. More particularly, the pellet infeed conveyor 14 can be a vibratory conveyor and the pellet discharge conveyor 16 can be a belt conveyor.

Figure 2:
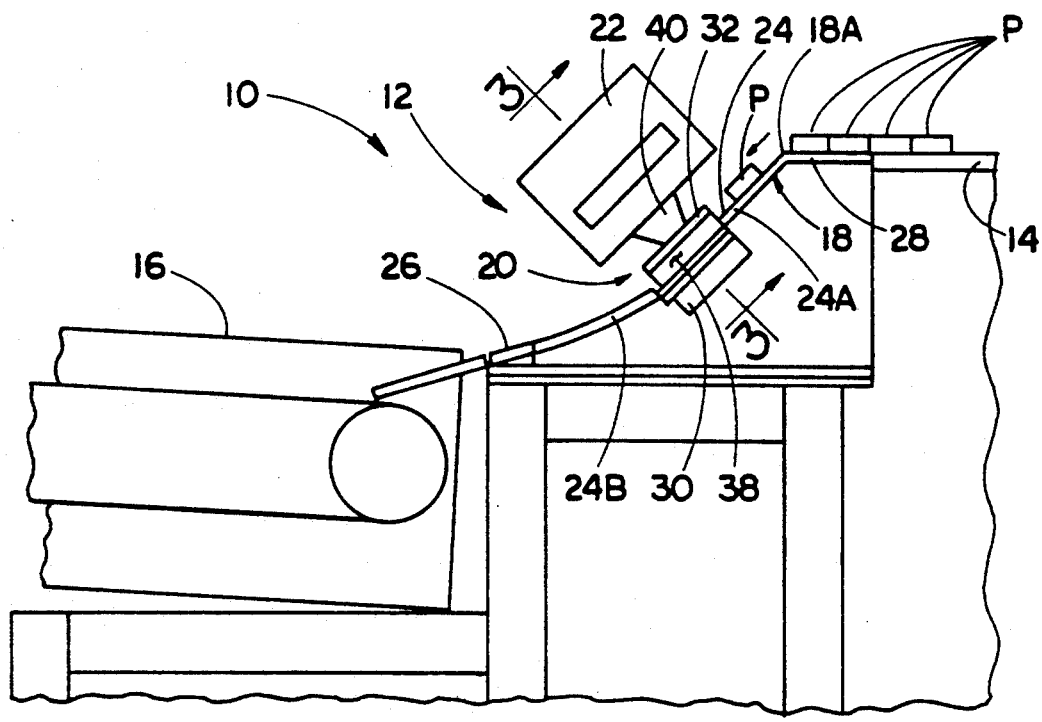
FIG. 2 is an enlarged fragmentary view of the apparatus of FIG. 1 illustrating a pellet slide and inspection assembly for separating and inspecting pellets employed by the apparatus.
Figure 3:
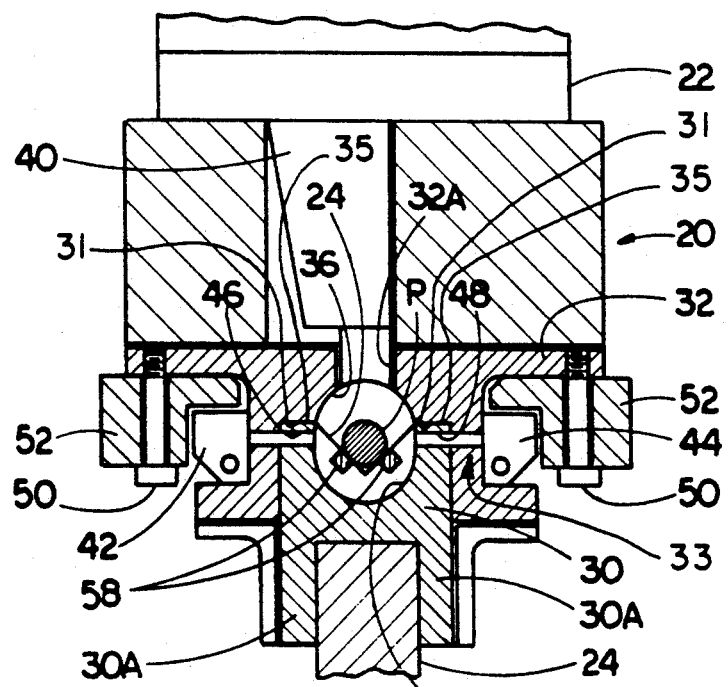
FIG. 3 is an enlarged sectional view of the pellet slide and inspection assembly of the apparatus taken along line 3—3 of FIG. 2.
Figure 11:
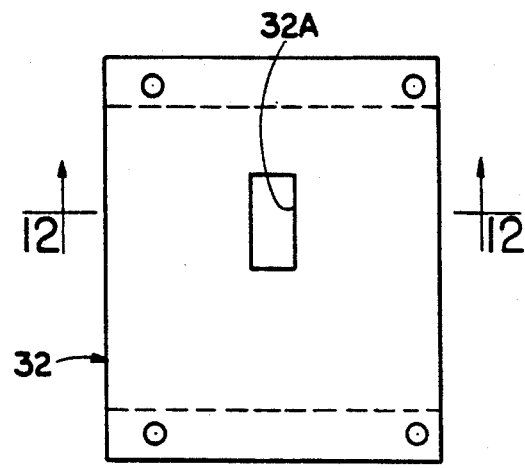
FIG. 11 is a top plan view of an upper reflector removed from the pellet slide and inspection assembly of FIG. 3.
Figure 13:
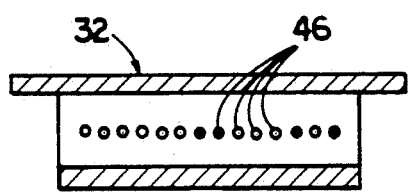
FIG. 13 is another sectional view of the upper reflector taken along line 13—13 of FIG. 12.
Figure 12:
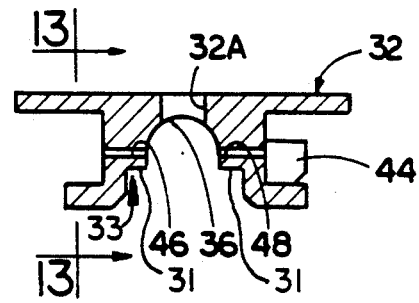
FIG. 12 is a sectional view of the upper reflector taken along line 12—12 of FIG. 11.
Figure 14:
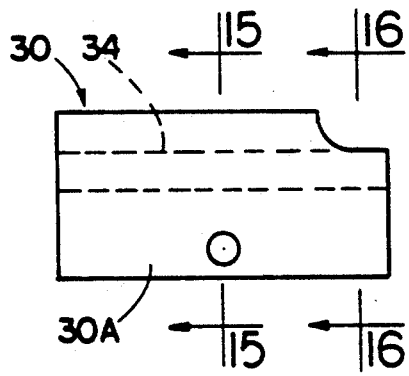
FIG. 14 is a side elevational view of a lower reflector removed from the pellet slide and inspection assembly of FIG. 3.
Figure 15:
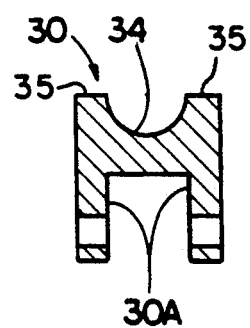
FIG. 15 is a sectional view of the lower reflector taken along line 15—15 of FIG. 14.
Figure 16:
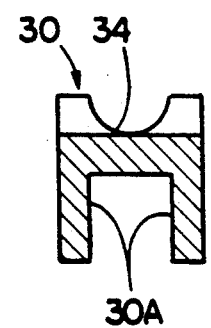
FIG. 16 is another sectional view of the lower reflector taken along line 16—16 of FIG. 14.

Referring to FIGS. 1-3, the pellet slide and inspection assembly 12 basically includes a pellet slide 18, an inspection station 20, and an ultrasonic inspection head 22. As also seen in FIGS. 4-10, the pellet slide 18 of the assembly 12 is an upstanding plate-like structure defining an inclined track 24. The track 24 is V-shaped in cross-section adapting it to support a cylindrical pellet P therealong. The track 24 has a lower exit end 26 adjacent to the discharge conveyor 16 and an upper entry end 28 adjacent to the infeed conveyor 14. The inclined orientation of the track 24 places its entry end 28 at a higher elevation than its exit end 26 such that a pellet P received at its entry end 28 will slide under the influence of gravity downwardly to its exit end 26 without any motive assistance.

The inspection station 20 is located along the inclined track 24 between and spaced from both the entry and exit ends 26, 28 thereof. The inspection head 22 is mounted at the inspection station 20 and is operable to transmit and receive sound energy to and from a pellet P as it moves through the inspection station 20. One pellet at a time is inspected for surface defects at the inspection station 20. Each pellet P is pushed over an upper ledge or edge 18A of the pellet slide 18 by another pellet P located behind it on the vibratory infeed conveyor 14. As each pellet goes over the edge 18A, it accelerates down the slide track 24, thereby creating a space or separation between it and the next succeeding pellet when pushed over the edge 18A. In such manner, each pellet P will move through the inspection station 20 one at a time.

The inclined track 24 of the pellet slide 18 also has an upper portion 24A which extends from the entry end 28 of the track 24 through the inspection chamber 20 and a lower portion 24B which extends from the inspection chamber 20 to the exit end 26 of the track 24. The upper portion 24A of the track 24 defines a substantially linear path of movement of the pellets from the entry end 28 of the track 24 through the inspection chamber 20. Likewise, the lower portion 24B of the track 24 defines a substantially linear path of movement of the pellets from the inspection chamber 20 to the exit end 26 of the track 24.

However, as can be readily observed in FIGS. 2 and 4, the lower portion 24B has a shallower, or more gradual, slope than the upper portion 24A of the track 24 so that the pellet P decelerates as it moves from the upper portion 24A to the lower portion 24B of the track 24. The deceleration reduces the velocity of the inspected pellet as it approaches the exit end 26 of the track 24. Thus, after each pellet P moves through the inspection chamber 20, it is decelerated by the change (decrease) in the slope of the slide track 24, which greatly reduces the possibility of the pellet chipping due to contact with the discharge conveyor 16 at the exit end 26 of the pellet slide 18.

Referring to FIGS. 11-16, inspection station 20 of the pellet slide and inspection assembly 12 includes lower and upper sound reflectors 30, 32 between which each pellet P travels through the inspection station 20. The upper sound reflector 32 has a recess 33 defined in a bottom thereof and a semicircular groove or cavity 36 defined in the recess 33 so as to provide recessed bottom surface portions 31 extending along opposite sides of the semicircular cavity 36. The lower sound reflector 30 has a semicircular groove or cavity 34 defined on a top thereof so as to provide top surface portions 35 extending along opposite sides of the semicircular cavity 34. The lower semicircular cavity 34 is complementary in size to the upper semicircular cavity 36. The lower sound reflector 30 inserts into the recess 33 of the upper sound reflector 32 so as to mate therewith at the respective top and bottom surface portions 31, 35 such that the respective have complementary semicircular grooves or cavities 34, 36 form an annular, or preferably cylindrical, inspection chamber 38 through which each pellet P moves as the pellet slides down the inclined track 24. The annular inspection chamber 38 completely encloses the circumferential surface of the pellet P as the pellet moves through the chamber 38 which provides improved accuracy in the sound signals reflected back to the inspection head 22.

The upper sound reflector 32 having a central opening 32A through which extends a lower portion of a horn 40 of the inspection head 22 mounted at the inspection station 20. Sound transmitting and receiving transducers (not shown) are contained by the inspection head 22. The sound energy is transmitted and received through the central opening 32A of the upper reflector 32. The upper sound reflector 32 also mounts light transmitting and sensing devices 42, 44 in alignment with first and second series of spaced apart holes 46, 48 defined through the body of the reflector on opposite sides of the inspection chamber 38. The transmitting devices 42 transmit light across the inspection chamber 38 and thus across the path of movement of a pellet P through the chamber. The sensing devices 44 receive the light transmitted across the inspection chamber 38 and thereby sense the position of the pellet P as it moves through the inspection chamber 38. Also, retainer bolts 50 and blocks 52 are attached to the upper reflector 32 for retaining the devices 42, 44 in the desired positions thereon in alignment with the series of holes 46, 48.

More particularly, the inclined track 24 of the pellet slide 18 has a cutout 54 located in its upper portion 24A, between and spaced from the entry and exit ends 28, 26 thereof. The lower sound reflector 30 has spaced legs 30A by which it is disposed over in straddling relation the slide 18 within the cutout 54 of the track 24. The lower reflector 30 also includes a pair of slots 56 seating a pair of rails 58. The rails 58 extend and bridge between opposite edges 54A of the track cutout 54 for supporting the pellet P as it moves through the inspection chamber 20, as can be seen in FIG. 3.

A pellet ejector device (not shown) may be disposed adjacent the exit end 26 of the track 24. It can be operated to prevent an inspected pellet found to be defective from exiting from the track 24 onto the discharge conveyor 16. Instead, the defective pellet can be diverted by the ejector device into a container for collection of the defective pellets. Since the ejector device forms no part of the present invention, it need not be illustrated nor described in any further detail.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In an apparatus for inspecting nuclear fuel pellets for surface defects, said apparatus including a pellet infeed conveyor and a pellet discharge conveyor, a pellet slide and inspection assembly comprising:

(a) a pellet slide defining an inclined track having an exit end adjacent to said discharge conveyor and an entry end adjacent to said infeed conveyor and at a higher elevation than said exit end;

(b) an inspection station located along said inclined track between said entry and exit ends of said track, said station including lower and upper sound reflectors being configured to define an annular inspection chamber through which a pellet moves as the pellet slides down said inclined track, said lower and upper sound reflectors defining said annular inspection chamber completely surrounding the circumferential surface of the pellet as the pellet moves through said chamber; and (c) an ultrasonic inspection head mounted at said inspection station and being operable to transmit and receive sound energy to and from a pellet as it moves through said inspection chamber such that the sound energy completely surrounds the moving pellet being inspected within said chamber;

(d) one of said lower and upper sound reflectors having an opening therethrough, said ultrasonic inspection head extending through said opening in said one of said lower and upper sound reflectors for transmitting and receiving sound energy to and from the pellet as it moves through said annular inspection chamber;

(e) one of said lower and upper sound reflectors having a recess defined therein, a first semicircular cavity defined in said recess and a pair of first surface portions defined along opposite sides of said first semicircular cavity, the other of said lower and upper sound reflectors having a second semicircular cavity defined therein being complementary to said first semicircular cavity and a pair of second surface portions defined along opposite sides of said second semicircular cavity, said other of said lower and upper sound reflectors being inserted into said recess of said one of said lower and upper sound reflectors so as to mate therewith at said respective pairs of surface portions such that said first and second semicircular cavities together define said annular inspection chamber and completely surround the circumferential surface of the pellet as the pellet moves through said chamber.

2. The assembly as recited in claim 1, wherein said track of said pellet slide includes an upper portion defining a substantially linear path of movement of a pellet from said entry end of said slide through said inspection chamber.

3. The assembly as recited in claim 1, wherein said track of said pellet slide includes:
   an upper portion extending from said entry end of said slide through said inspection chamber; and
   a lower portion extending from said inspection chamber to an exit end of said slide along which each pellet moves after passing through said inspection chamber, said lower portion having a shallower slope than said upper portion of said pellet slide so as to cause deceleration of the pellet as it moves from said upper portion to said lower portion of said track which reduces the velocity of the inspected pellet as it approaches said exit end of said pellet track.

4. The assembly as recited in claim 1, further comprising:
   means disposed in one of said lower and upper sound reflectors for transmitting light across the inspection chamber and thus across the path of movement of a pellet through said chamber; and
   means disposed in one of said lower and upper sound reflectors for receiving the light transmitted across the inspection chamber and thereby sensing the position of a pellet in said chamber.

5. The assembly as recited in claim 4, further comprising:
   means for retaining said light transmitting and receiving means on said one of said lower and upper sound reflectors.

6. The assembly as recited in claim 1, wherein:
   said track of said slide has a cutout located between and spaced from said entry and exit ends thereof; and
   said lower sound reflector is disposed within said cutout of said slide track.

7. The assembly as recited in claim 6, wherein said a pair of rails are mounted in said lower sound reflector and extend between opposite edges of said cutout of said track for supporting a pellet as it moves through said inspection chamber.

8. In an apparatus for inspecting nuclear fuel pellets for surface defects, said apparatus including a pellet infeed conveyor and a pellet discharge conveyor, a pellet slide and inspection assembly comprising:
   (a) a pellet slide defining an inclined track having an exit end adjacent to said discharge conveyor and an entry and adjacent to said infeed conveyor and at a higher elevation than said exit end;
   (b) an inspection station located along said inclined track between and spaced from said entry and exit ends of said track, said station including lower and upper sound reflectors being configured to define an annular inspection chamber through which a pellet moves as the pellet slides down said inclined track, one of said lower and upper sound reflectors having a recess defined therein, a first semicircular cavity defined in said recess and a pair of first surface portions defined along opposite sides of said first semicircular cavity, the other of said lower and upper sound reflectors having a second semicircular cavity defined therein being complementary to said first semicircular cavity and a pair of second surface portions defined along opposite sides of said second semicircular cavity, said other of said lower and upper sound reflectors being inserted into said recess of said one of said lower and upper sound reflectors so as to mate therewith at said respective pairs of surface portions such that said first and second semicircular cavities together define said annular inspection chamber completely surrounding the circumferential surface of the pellet as the pellet moves through said chamber; and
   (c) an ultrasonic inspection head mounted at said inspection station and being operable to transmit and receive sound energy to and from a pellet as it moves through said inspection chamber;
   (d) said track of said pellet slide having an upper portion extending from said entry end of said track through said inspection chamber and a lower portion extending from said inspection chamber to said exit end of said track along which each pellet moves after passing through said inspection chamber, said upper portion of said track defining a substantially linear path of movement of a pellet from said entry end of said track through said inspection chamber, said lower portion of said track defining a substantially linear path of movement of a pellet from said inspection chamber to said exit end of said track, said lower portion having a shallower slope than said upper portion of said track so as to cause deceleration of the pellet as it moves from said upper portion to said lower portion of said track which reduces the velocity of the inspected pellet as it approaches said exit end of said track.

9. The assembly as recited in claim 8, further comprising:
   means disposed at said inspection chamber for transmitting light across the inspection chamber and thus across the path of movement of a pellet through said chamber; and
   means disposed at said inspection chamber for receiving the light transmitted across the inspection chamber and thereby sensing the position of a pellet in said chamber.

10. In an apparatus for inspecting nuclear fuel pellets for surface defects, said apparatus including a pellet infeed conveyor and a pallet discharge conveyor, a pallet slide and inspection assembly comprising:
    (a) a pellet slide defining an inclined track having an exit end adjacent to said discharge conveyor and an entry end adjacent to said infeed conveyor and at a higher elevation than said exit end;
    (b) an inspection station located along said inclined track between and spaced from said entry and exit ends of said track, said station including lower and upper sound reflectors being configured to define an annular inspection chamber through which a pallet moves as the pellet slides down said inclined track, one of said lower and upper sound reflectors having a recess defined therein, a first semicircular cavity defined in said recess and a pair of first surface portions defined along opposite sides of said first semicircular cavity, the other of said lower and upper sound reflectors having a second semicircular cavity defined therein being complementary to said first semicircular cavity and a pair of second surface portions defined along opposite sides of said second semicircular cavity, said other of said lower and upper sound reflectors being inserted into said recess of said one of said lower and upper sound reflectors so as to mate therewith at said respective pairs of surface portions such that said first and second semicircular cavities together define said annular inspection chamber completely surrounding the circumferential surface of the pellet as the pellet moves through said chamber, said upper sound reflector having an opening therethrough; and (c) an ultrasonic inspection head mounted at said inspection station and extending through said opening of said upper sound reflector, said head being operable to transmit and receive sound energy to and from a pellet as it moves through said inspection chamber such that the sound energy completely surrounds the moving pellet being inspected within said chamber;

(d) said track of said pellet slide having an upper portion extending from said entry end of said track through said inspection chamber and a lower portion extending from said inspection chamber to an exit end of said track along which each pellet moves after passing through said inspection chamber, said lower portion having a shallower slope than said upper portion of said track so as to cause deceleration of the pellet as it moves from said upper portion to said lower portion of said track which reduces the velocity of the inspected pellet as it approaches said exit end of said track.

11. The assembly as recited in claim 10, wherein said upper portion of said track defines a substantially linear path of movement of a pellet from said entry end of said track through said inspection chamber.

12. The assembly as recited in claim 10, wherein said lower portion of said track defines a substantially linear path of movement of a pellet from said inspection chamber to said exit end of said track.

13. The assembly as recited in claim 10, further comprising:

means disposed on said upper sound reflector for transmitting light across the inspection chamber and thus across the path of movement of a pellet through said chamber; and means disposed on said upper sound reflector for receiving the light transmitted across the inspection chamber and thereby sensing the position of a pellet in said chamber.

14. The assembly as recited in claim 13, further comprising:

means for retaining said light transmitting and receiving means on said upper sound reflector.

15. The assembly as recited in claim 10, wherein said lower and upper sound reflectors have respective semicylindrical cavities defined therein which together define said annular inspection chamber.

16. The assembly as recited in claim 10, wherein:

said track of said slide has a cutout located between and spaced from said entry and exit ends thereof; and said lower sound reflector is disposed within said cutout of said slide track and includes a pair of rails mounted between opposite edges of said cutout portion of said track for supporting a pellet as it moves through said inspection chamber.

* * * * *